United States Patent
Korhonen et al.

(10) Patent No.: US 9,986,425 B2
(45) Date of Patent: May 29, 2018

(54) APPARATUS AND METHOD FOR ROUTING IN A NETWORK

(75) Inventors: Jouni Korhonen, Riihimaki (FI); Teemu Savolainen, Nokia (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 9 days.

(21) Appl. No.: 14/116,805

(22) PCT Filed: May 13, 2011

(86) PCT No.: PCT/EP2011/057735
§ 371 (c)(1),
(2), (4) Date: Nov. 11, 2013

(87) PCT Pub. No.: WO2012/155944
PCT Pub. Date: Nov. 22, 2012

(65) Prior Publication Data
US 2014/0098812 A1    Apr. 10, 2014

(51) Int. Cl.
*H04W 8/26* (2009.01)
*H04L 12/741* (2013.01)
*H04L 29/12* (2006.01)
*H04W 80/04* (2009.01)

(52) U.S. Cl.
CPC ............... *H04W 8/26* (2013.01); *H04L 45/74* (2013.01); *H04L 61/2053* (2013.01); *H04L 61/6068* (2013.01); *H04L 61/2015* (2013.01); *H04L 61/2092* (2013.01); *H04W 80/04* (2013.01)

(58) Field of Classification Search
CPC .................................. H04W 8/26; H04L 45/74
See application file for complete search history.

(56) References Cited

U.S. PATENT DOCUMENTS 7,633,884 B2 * 12/2009 Kang ................. H04L 29/12254
370/254
7,741,955 B2 *  6/2010 Park ................... G06K 7/10049
340/10.2

(Continued)

FOREIGN PATENT DOCUMENTS

WO    2011/009493 A1    1/2011

OTHER PUBLICATIONS

Internet Engineering Task Force (IETF), Request for Comments: 6059, S. Krishnan et al, Nov. 2010, Simple Procedures for Detecting Network Attachment in IPv6.

(Continued)

*Primary Examiner* — Rasheed Gidado
(74) *Attorney, Agent, or Firm* — Squire Patton Boggs (US) LLP

(57) ABSTRACT

A mechanism for routing in a network is described. The mechanism comprising receiving a request from a node; obtaining, based on the received request, an identifier relevant to said node; allocating a first local prefix; setting a first timer indicating a length of time the first local prefix or an address comprising the first local prefix is valid; setting a second timer indicating a length of time the first local prefix or the address comprising the first local prefix is preferred when the first local prefix or the address is valid; and sending a first message comprising said identifier, said first local prefix and said first timer to a network element.

18 Claims, 6 Drawing Sheets

(56) References Cited

U.S. PATENT DOCUMENTS

| | | | |
|---|---|---|---|
| 8,788,826 B1* | 7/2014 | Zhao | H04L 29/12283 713/162 |
| 8,832,238 B2* | 9/2014 | Gaitonde | H04L 61/6059 709/220 |
| 2005/0111377 A1* | 5/2005 | Lioy | H04L 29/06 370/252 |
| 2010/0040021 A1* | 2/2010 | Aso | H04W 8/06 370/331 |
| 2010/0095011 A1* | 4/2010 | Sarikaya et al. | 709/229 |
| 2010/0316019 A1* | 12/2010 | Liu | H04L 29/12264 370/331 |
| 2010/0316035 A1* | 12/2010 | Hirano | H04W 40/24 370/338 |
| 2011/0051659 A1* | 3/2011 | Oulai | 370/328 |
| 2011/0103340 A1* | 5/2011 | Zhu | H04W 36/0011 370/329 |
| 2011/0116475 A1* | 5/2011 | Jeyatharan | H04W 36/0022 370/331 |
| 2011/0134922 A1* | 6/2011 | Wen et al. | 370/392 |

OTHER PUBLICATIONS

Proxy Mobile IPv6; rfc5213.txt, Gundavelli S. et al, Internet Engineering task force, IETF; Standard, Internet society (ISOC) 4, XP015060252, Aug. 1, 2008.

Network Working Group, Request for Comments: 3971, J. Arkko, Ed. et al, SEcure Neighbor Discovery (SEND), Mar. 2005.

IPv6 Stateless Address Autoconfiguration, Thomson et al, rfc4862. txt; Sep. 1, 2007, XP015052408.

Network Working Group, Request for Comments: 3315, R. Droms, Ed. et al, Jul. 2003, Dynamic Host Configuration Protocol for IPv6 (DHCPv6).

Approaches to Distributed mobility management using Mobile IPv6 and its extensions, Patil B et al, draft-patil-mex-dmm-approaches-00.txt; Mar. 7, 2011, pp. 1-12, XP015074433.

Dynamic Mobility Anchoring, Seite P et al, draft-seite-netext-dma-00.txt; May 19, 2010, pp. 1-15, XO015068596.

Use of Proxy Mobile IPv6 for Distributed Mobility Control, Koh S et al, draft-sjkoh-mext-pmip-dmc-01.txt; No. 1, Mar. 14, 2011, pp. 1-14, XP015074923.

International Search Report dated Feb. 20, 2012, issued in corresponding International Application No. PCT/EP2011/057735.

A Summary of Distributed Mobility Management draft-kuntz-dmm-summary-00, R. Kuntz et al., MEXT Working Group, May 5, 2011, pp. 1-20.

T. Narten et al., "Neighbor Discovery for IP Version 6 (IPv6)," Network Working Group, RFC 4861, Request for Comments: 4861; Obsoletes: 2461; Category: Standards Track; Sep. 2007, pp. 1-97.

* cited by examiner

APPARATUS AND METHOD FOR ROUTING IN A NETWORK

FIELD OF THE INVENTION

The invention addresses issues regarding how to improve routing in a network, in particular, where IPv6 (Internet Protocol v6) is adopted as IP protocol and, on the top of which, Proxy Mobile IPv6 (PMIPv6) is deployed as mobility management protocol.

BACKGROUND OF THE INVENTION

In a network where Internet operates under IPv6, IPv6 address shall be assigned to each constituent network element. IPv6 addresses are logically divided into two parts: a 64-bit (sub-)network prefix and a 64-bit interface identifier. A network prefix is normally associated with a specific domain, which means that a data packet designated to an IPv6 address comprising the network prefix may be routed to a router/network entity located in that specific domain.

On top of IPv6, PMIPv6 may be deployed as a network layer protocol for managing mobility of mobile nodes (MN) as depicted in FIG. 1. In PMIPv6 domain, there are two important network entities—Local Mobility Anchor (LMA) and the Mobile Access Gateway (MAG). MAG is a function on an access router that manages the mobility related signaling for a MN attached to its access link, e.g. a radio link. LMA is the home agent for a MN in PMIPv6 domain. A mobile node identifier (MN-ID) may be assigned to a MN in PMIPv6 domain. It is a stable identifier of a MN that mobility entities in PMIPv6 domain can always acquire and use for predictably identifying a MN. This is typically an identifier such as a network access identifier (NAI) or other identifier such as a media access control (MAC) address.

When a MN initially tries to attach to a network, a Home Network Prefix (HNP) is generated in LMA and assigned to the link between the MN and a MAG, e.g., $MAG_1$ as shown in FIG. 1. The home network prefix is anchored at LMA (which means that a data packet designated to an IPv6 address comprising the prefix as its network prefix would be routed to LMA) and indicates the home network of the MN. More than one prefix can be assigned to the link between MN and MAG according to PMIPv6. The MN may configure its interfaces with one or more addresses from the obtained home network prefix, e.g. home network prefix+an interface identifier. When the MN roams, a handover in access link layer may be performed and as the result, the MN may be connected with a new MAG, e.g., $MAG_2$, located in a different domain than $MAG_1$. However, due to the originally assigned HNP, all the IP traffic is delivered to and from the MN via LMA and $MAG_2$. Moreover, the home network associated with the home network prefix may be in completely different domain (e.g. Domain 3) than $MAG_2$ which is located in Domain 2. When traffic volumes grow significantly and the majority of the IP services are provided locally in IP topology wise, the LMA could easily become a bottleneck as it may become the traffic concentrator for multiple MAGs.

SUMMARY OF THE INVENTION

The present invention and its embodiments seek to address one or more of the above-described drawbacks and shortcomings. According to an exemplary first aspect of the invention, there is provided a method for a network element comprising receiving a request from a node; obtaining, based on the received request, an identifier relevant to said node; allocating a first local prefix; setting a first timer indicating a length of time the first local prefix or an address comprising the first local prefix is valid; setting a second timer indicating a length of time the first local prefix or the address comprising the first local prefix is preferred when the first local prefix or the address is valid; and sending a first message comprising said identifier, said first local prefix and said first timer to a network element. A local prefix is a prefix anchored at said network element.

According to one embodiment of the invention, said method further comprises receiving a response message comprising a second local prefix and a third timer indicating a length of time the second local prefix or an address comprising the second local prefix is valid; determining if said second local prefix is identical to the first local prefix; in the event that said second local prefix is identical to the first local prefix, sending to the node a second message comprising the first local prefix, the first timer, the second timer and an indication to use a prefix for address configuration; in the event that the second local prefix is different from the first local prefix, setting a fourth timer indicating a length of time the second local prefix or the address comprising the second local prefix is preferred when the second local prefix or the address is valid to 0, sending a second message comprising the first local prefix, the first timer, the second timer, the second local prefix, the third timer, the fourth timer, and an indication to use a prefix for address configuration to the node.

Alternatively, according to another embodiment of the invention, said method further comprises receiving, from said network element, a response message comprising a second local prefix, a third timer indicating a length of time the second local prefix or an address comprising the second local prefix is valid, a fourth timer indicating a length of time the second local prefix or the address comprising the second local prefix is preferred when the second local prefix or the address is valid and an indication to use a prefix for address configuration; determining if said second local prefix is identical to the first local prefix; in the event that said second local prefix is identical to the first local prefix, sending the received response message to the node; in the event that the second local prefix is different from the first local prefix, sending a router advertisement message to the node.

According to another aspect of the invention, there is provided method for a server comprising receiving, from a network entity, a message comprising an identifier relevant to a node, a first local prefix and a first timer indicating a length of time the first local prefix or an address comprising the first local prefix is valid; determining if an entry associated with the identifier exists or not; in the event that the entry does not exist, storing the received information, setting a second timer indicating a length of time the first local prefix or the address comprising the first local prefix is preferred when the first local prefix or the address is valid, and sending a response message comprising the received information, the second timer and an indication to use a prefix for address configuration to the network entity.

According to further development or modification of the invention, said method further comprises, in the event that the entry exists, wherein said entry comprises a second local prefix and a third timer indicating a length of time the second local prefix or an address comprising the second local prefix is valid, replacing the second local prefix and the third timer by the first local prefix and the first timer.

According to a third embodiment of the invention, said method is implemented by using a stateless address autoconfiguration protocol. Said method further comprises sending a response message comprising the second local prefix and the third timer to the network entity.

Optionally, according to a fourth embodiment of the invention, said method is implemented by using a dynamic host configuration protocol v6. Said method further comprises sending a response message comprising the second local prefix to the network entity.

According to further development or modification of the fourth embodiment of invention, said method further comprises setting a second timer indicating a length of time the first local prefix or the address comprising the first local prefix is preferred when the first local prefix or the address is valid, setting a fourth timer indicating a length of time the second local prefix or the address comprising the second local prefix is preferred when the second local prefix or the address is valid to 0, setting the third timer to 0, sending a response message comprising the first timer, the second timer, the third timer, the fourth timer, the first and the second local prefix, and an indication to use a prefix for address configuration to the node.

According to a third aspect of the invention, there is provided a network element comprising a processing unit, a first interface unit and a second interface unit, wherein said first interface unit is configured to receive a request from a node; said processing unit is configured to obtain, based on the received request, an identifier relevant to said node, allocate a first local prefix, set a first timer indicating a length of time the first local prefix or an address comprising the first local prefix is valid; set a second timer indicating a length of time the first local prefix or the address comprising the first local prefix is preferred when the first local prefix or the address is valid, and send a first message comprising said identifier, said first local prefix and said first timer to a network element through the second interface unit.

According to a fifth embodiment of the invention, said second interface unit is configured to receive a response message comprising a second local prefix and a third timer indicating a length of time the second local prefix or an address comprising the second local prefix is valid; said processing unit is further configured to determine if said second local prefix is identical to the first local prefix; in the event that said second local prefix is identical to the first local prefix, said processing unit is configured to send to the node a second message comprising the first local prefix, the first timer, the second timer and an indication to use a prefix for address configuration through said first interface unit; in the event that the second local prefix is different from the first local prefix, said processing unit is configured to set a fourth timer indicating a length of time the second local prefix or the address comprising the second local prefix is preferred when the second local prefix or the address is valid to 0, and send a second message comprising the first local prefix, the first timer, the second timer, the second local prefix, the third timer, the fourth timer, and an indication to use a prefix for address configuration to the node through said first interface unit.

Alternatively, according to a sixth embodiment of the invention, said second interface unit is configured to receive, from said network element, a response message comprising a second local prefix, a third timer indicating a length of time the second local prefix or an address comprising the second local prefix is valid, a fourth timer indicating a length of time the second local prefix or the address comprising the second local prefix is preferred when the second local prefix or the address is valid and an indication to use a prefix for address configuration; said processing unit is further configured to determine if said second local prefix is identical to the first local prefix; in the event that said second local prefix is identical to the first local prefix, said processing unit is configured to send the received response message to the node (MN) through said first interface unit; in the event that the second local prefix is different from the first local prefix, said processing unit is configured to send a router advertisement message to the node through said first interface unit.

According to a fourth aspect of the invention, there is provided a server comprising a processing unit, an interface unit and a database, wherein said interface unit is configured to receive, from a network entity, a message comprising an identifier relevant to a node, a first local prefix and a first timer indicating a length of time the first local prefix or an address comprising the first local prefix is valid; said processing unit is configured to determine if an entry associated with the identifier exists or not; in the event that the entry does not exist, said database is configured to store the received information, said processing unit is configured to set a second timer indicating a length of time the first local prefix or the address comprising the first local prefix is preferred when the first local prefix or the address is valid, and send a response message comprising the received information and the second timer to the network entity through said interface unit.

According to further development or modification of the fourth aspect of the invention, in the event that the entry exists and said entry comprises a second local prefix and a third timer indicating a length of time the second local prefix or an address comprising the second local prefix is valid, said processing unit is configured to replace the second local prefix and the third timer by the first local prefix and the first timer.

According to a seventh embodiment of the invention, said server is configured to implement a stateless address autoconfiguration protocol. Said processing unit is further configured to send a response message comprising the second local prefix and the third timer to the network entity through said interface unit.

According to an eighth embodiment of the invention, said server is configured to implement a dynamic host configuration protocol. Said processing unit is further configured to send a response message comprising the second local prefix to the network entity through said interface unit.

According to further development or modification of the eighth embodiment of invention, wherein said processing unit is further configured to set a second timer indicating a length of time the first local prefix or the address comprising the first local prefix is preferred when the first local prefix or the address is valid, set a fourth timer indicating a length of time the second local prefix or the address comprising the second local prefix is preferred when the second local prefix or the address is valid to 0, set the third timer to 0, and send a response message comprising the first timer, the second timer, the third timer, the fourth timer, the first and the second local prefix, and an indication to use a prefix for address configuration to the node through said interface unit.

According to a fifth aspect of the invention, there is provided a computer program product comprising means for receiving a request from a node; means for obtaining, based on the received request, an identifier relevant to said node; means for allocating a first local prefix; means for setting a first timer indicating a length of time the first local prefix or an address comprising the first local prefix is valid; means for setting a second timer indicating a length of time the first local prefix or the address comprising the first local prefix is preferred when the first local prefix or the address is valid; and means for sending a first message comprising said identifier, said first local prefix and said first timer to a network element.

According to a sixth aspect of the invention, there is provided a computer program product comprising means for receiving, from a network entity, a message comprising an identifier relevant to a node, a first local prefix and a first timer indicating a length of time the first local prefix or an address comprising the first local prefix is valid; means for determining if an entry associated with the identifier exists or not; in the event that the entry does not exist, means for storing the received information, means for setting a second timer indicating a length of time the first local prefix or the address comprising the first local prefix is preferred when the first local prefix or the address is valid; and means for sending a response message comprising the received information, the second timer and an indication to use a prefix for address configuration to the network entity.

BRIEF DESCRIPTION OF THE DRAWINGS

Exemplary embodiments of the invention are described below, by way of example only, with reference to the following numbered drawings.

DESCRIPTION OF THE EMBODIMENTS OF THE INVENTION

Figure 1:
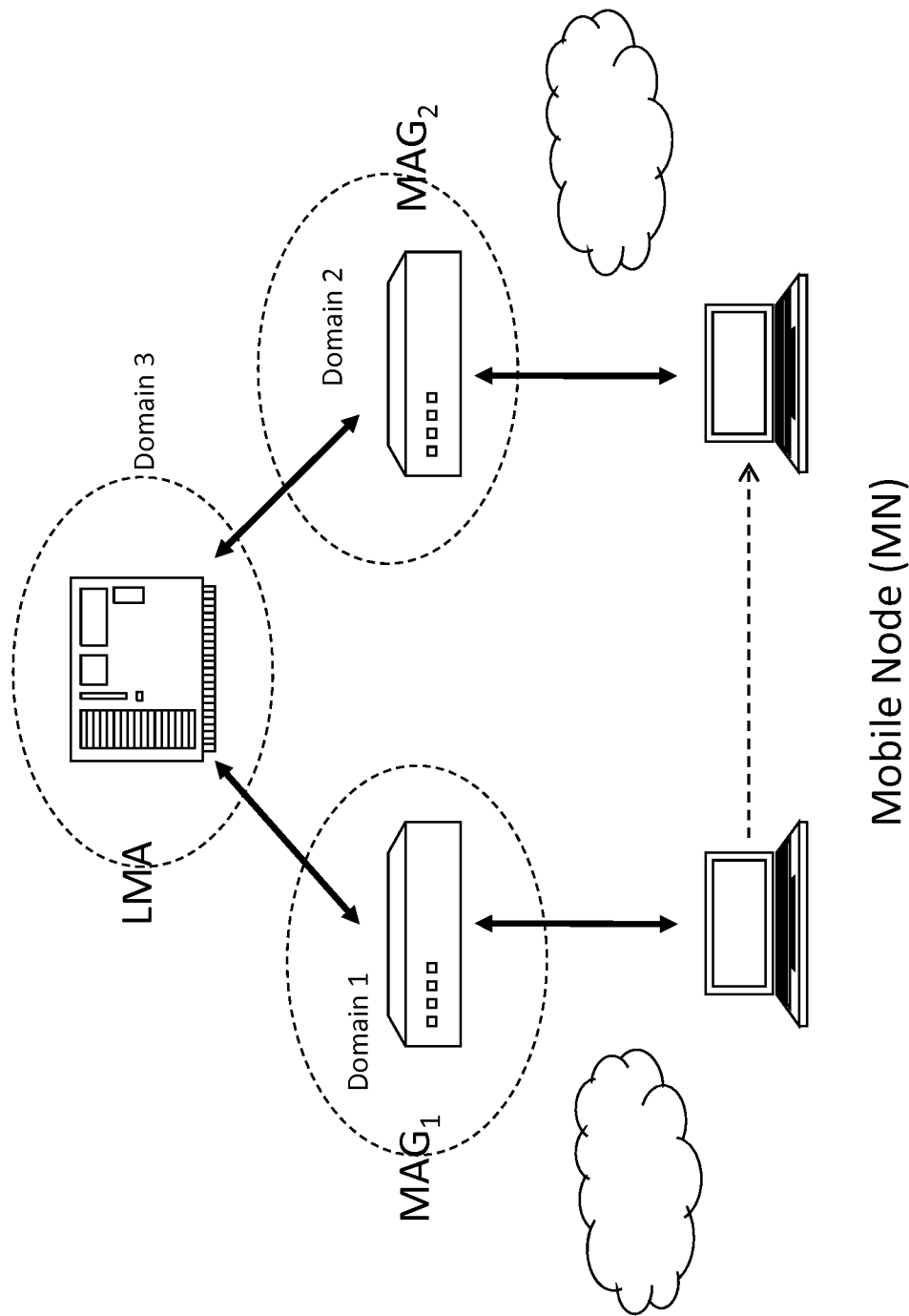
FIG. 1 is an exemplary example illustrating a network where PMIPv6 is deployed as mobility management protocol for mobile nodes (MN).
Figure 2:
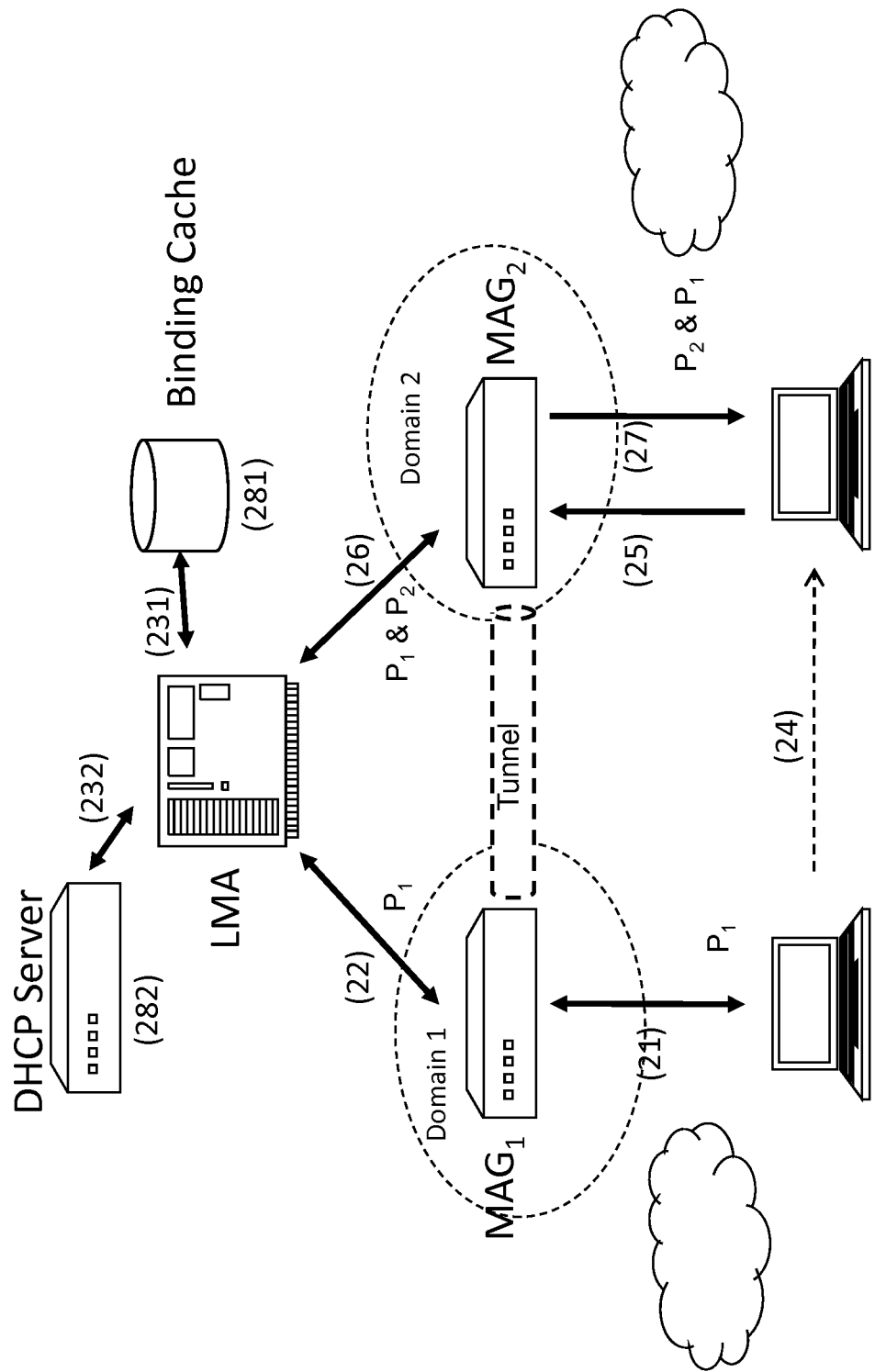
FIG. 2 briefly describes the overall arrangement of the solution according to one aspect of the invention.

In order to avoid the above-mentioned bottleneck effect, especially when the amount of traffic grows significantly, it is desired to allow a MN to directly access public Internet via a local MAG (e.g. $MAG_1$ or $MAG_2$) to which it is connected, bypassing the LMA. FIG. 2 depicts an overview of the arrangement according to one aspect of the invention.

Assuming a MN tries to connect to a MAG e.g. $MAG_1$. It may initiate an attach request to $MAG_1$. $MAG_1$ may allocate a local prefix (e.g. $P_1$) for the MN and also communicate this prefix to the LMA (step 21 & 22). A local prefix is a prefix anchored at a MAG. A MN may configure one of its interfaces by using the prefix, e.g. prefix+an interface identifier. Through that interface, the MN may access Internet without routing through the LMA. The prefix may be stored in the Binding Cache of the LMA or other network entity, such as a DHCP (Dynamic Host Configuration Protocol) server. The Binding Cache and the DHCP server may be standalone network entity respectively or integrated into LMA due to performance reasons. The DHCP server may support both DHCPv4 and DHCPv6.

There are two attributes, valid lifetime and preferred lifetime, associated with a local prefix. Valid lifetime indicates the length of time an address or a prefix remains in the valid state (i.e., the time until invalidation). The valid lifetime must be greater than or equal to the preferred lifetime. When the valid lifetime expires, the address becomes invalid. Invalid addresses may not appear as the destination or source address of a packet. In case an invalid address is used as a destination address, the Internet routing system will be unable to deliver the packet. If it is used as a source address, the recipient of the packet will be unable to respond.

Preferred lifetime is the length of time that a valid address or prefix is preferred (i.e., the time until deprecation). When the preferred lifetime expires, the address becomes deprecated. Assigning a deprecated address to an interface is not recommended, but not forbidden. A deprecated address may no longer be used as a source address in new communications, but packets sent from or to deprecated addresses are delivered as expected. A deprecated address may continue to be used as a source address in communications where switching to a preferred address causes hardship to a specific upper-layer activity (e.g., an existing TCP connection).

When the MN roams at step 24, it may initiate another attach request to $MAG_2$ which is located in Domain 2 (step 25). $MAG_2$ may allocate another local prefix (e.g. $P_2$) anchored at $MAG_2$ for the MN and also communicate the new local prefix to LMA. LMA may replace $P_1$ by $P_2$ in the Binding Cache entry. $MAG_2$ may provide the new prefix $P_2$ to MN and inform the MN to use the new local prefix $P_2$ and deprecate $P_1$ by setting preferred lifetime to be 0. The MN may configure one of its interfaces by using the new prefix so that it may access e.g. public Internet via $MAG_2$ without going through the LMA.

In an application, there may be a certain period when both $P_1$ and $P_2$ are usable, e.g. their valid lifetime have not yet expired. A temporary tunnel may be established between $MAG_1$ and $MAG_2$ so that the reverse traffic (with respect to the data sent out when the previous $P_1$ was in use) heading for $MAG_1$ may still be routed to $MAG_2$. In other words, such temporary tunnel may allow data traffic designating an IPv6 address comprising the old prefix reach the MN under the new $MAG_2$ as long as the valid lifetime of the old prefix is still valid. Once the valid lifetime of the old prefix $P_1$ expires, the tunnel between $MAG_1$ and $MAG_2$ and routing entries may be removed.

According to different embodiments of the invention, Stateless Address Autoconfiguration Protocol (SLAAC) and DHCPv6 (Dynamic Host Configuration Protocol v6) may be adopted for prefix management. The use of either protocol may depend on system level configuration. In the case of DHCPv6, a LMA may comprise a DHCP server. Alternatively, the DHCP server may be a standalone entity.

Figure 3:
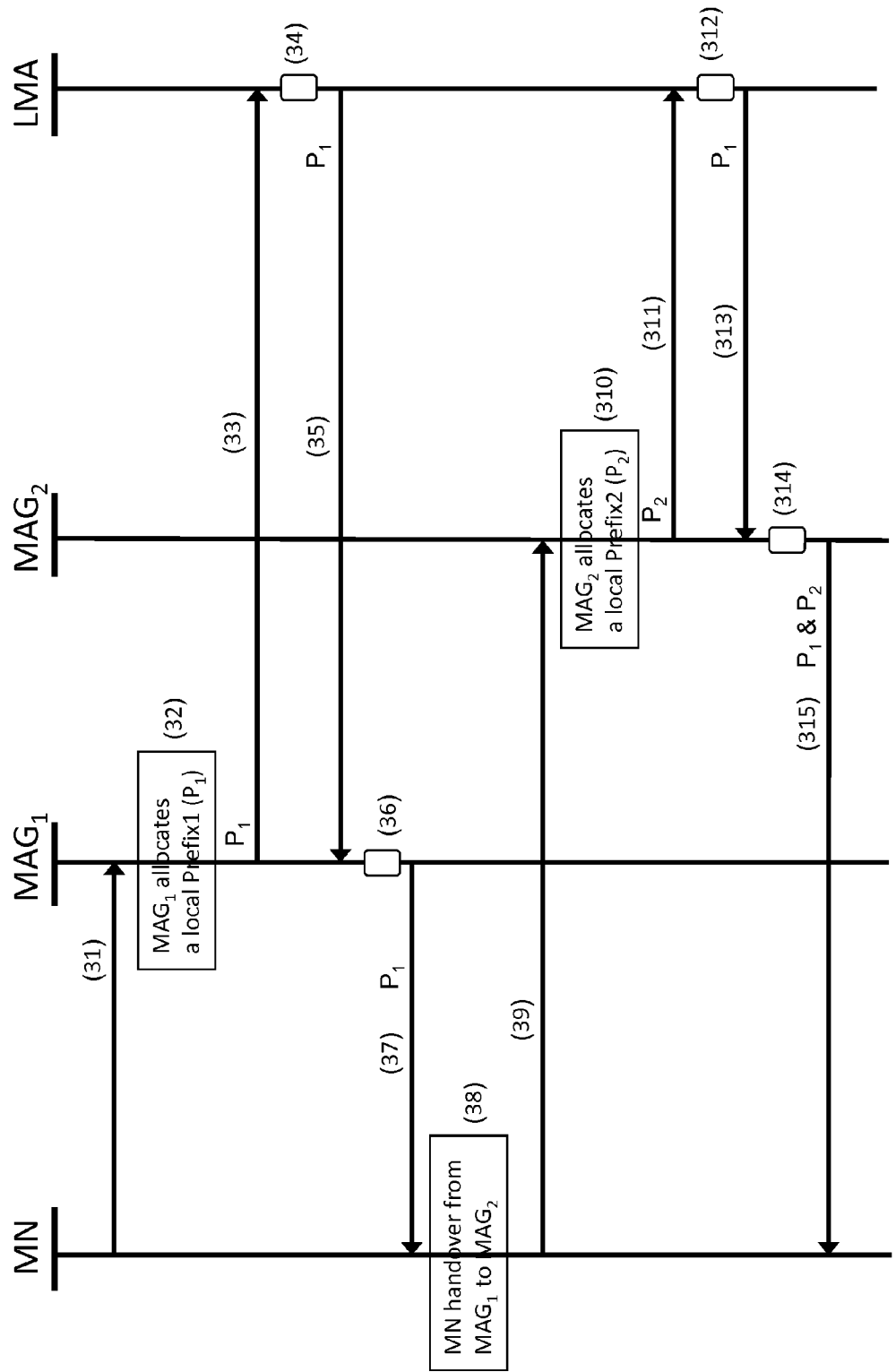
FIG. 3 depicts message flow among MN, MAGs and LMA when Stateless Address Autoconfiguration Protocol (SLAAC) is used for local prefix management according to one embodiment of the invention.

FIG. 3 describes the signalling flow when Stateless Address Autoconfiguration Protocol (SLAAC) is used for local prefix management according to one embodiment of the invention. A MN may initiate a request comprising its identifier to $MAG_1$ at step 31. Depending on the technology being used at radio access layer, e.g. Wireless LAN (WLAN), 3G and etc, the identifier may be different. For instance, it may be an identifier of the MN or an interface identifier of the MN. In the case of 3G or LTE, the identifier may be IMSI (=International Mobile Subscriber Identity). The request may be sent via a layer 2 attach message. Upon receiving the request, $MAG_1$ may allocate a first local prefix (e.g. $P_1$) for the MN at step 32 and set valid lifetime and preferred lifetime for the prefix according to its local configuration. $MAG_1$ may set used valid lifetime the same value as valid lifetime (i.e. used valid lifetime=valid lifetime). $MAG_1$ may also generate a MN-ID in PMIPv6 domain for the MN. MN-ID is associated with the identifier of the MN obtained at radio access layer (at step 31).

In some embodiments, it is may be recommended to set valid lifetime between e.g. 30-60 seconds to allow rapid invalidation of the prefix. A short valid lifetime means frequent router advertisement update for a MN, which could increase the battery consumption in a wireless/cellular environment (due to the fact the MN may not be able to operate in power saving mode). If battery consumption of a MN is of utmost importance, valid lifetime may be increased to a higher value at the expenses of making the temporary local prefix invalidation time longer. Longer prefix invalidation time implies a longer period where $P_1$ may still be used under the $MAG_2$, however, traffic using $P_1$ may be dropped as it topologically belongs to domain where $MAG_1$ is located.

Then $MAG_1$ may inform LMA the MN-ID, the first local prefix (e.g. $P_1$) and the used valid lifetime at step 33. LMA may check if there is already an entry with respect to the MN-ID and if not, it may store these information either by itself in the binding cache or in another network entity, e.g. when binding cache is a standalone entity (step 34). Then a response comprising the stored information and HNP may be sent from LMA to $MAG_1$ (step 35). Upon receiving the response from LMA, $MAG_1$ may detect that the received prefix is the first local prefix ($P_1$) which was sent to the LMA (step 36). $MAG_1$ may send a message comprising HNP, the first local prefix together with its attributes valid lifetime and preferred lifetime to the MN at step 37. A router advertisement (RA) message according to RFC4862 may be used for sending the message. The M-flag in the RA message may be set to 0 indicating MN that SLAAC is used for address configuration. The local prefix (e.g. $P_1$) may be inserted to Prefix Information Option (PIO) field of the RA message. A-flag field in RA message may be set to 1 in order to indicate that the MN may use the prefix for stateless address autoconfiguration.

According to one aspect of the invention, the MN may roam at step 38. A handover may be performed at radio access layer so that the MN may be connected with $MAG_2$ after initiating another request comprising an identifier of the MN to $MAG_2$ at step 39. $MAG_2$ may be located in a different domain (e.g. Domain 2) than $MAG_1$ (e.g. Domain 1). Upon receiving the request, $MAG_2$ may allocate a second local prefix (e.g. $P_2$) for the MN and set valid lifetime, used valid lifetime and preferred lifetime for the second local prefix (step 310), similar to step 32. $MAG_2$ may also generate a MN-ID in PMIPv6 domain for the MN. MN-ID is associated with the identifier of the MN obtained at radio access layer (at step 39). With respect to the same MN, the generated MN-ID should be identical.

Similar to step 33, MN-ID, the second local prefix (e.g. $P_2$) and the used valid lifetime are delivered to LMA at step 311. Based on the obtained MN-ID, LMA may check if there is already an entry for the MN-ID. If so, it may replace the previous local prefix (e.g. $P_1$) by the new prefix (e.g. $P_2$) and previous used valid lifetime by the new used valid lifetime at step 312. LMA may send a response to $MAG_2$ comprising HNP, $P_1$ and its (i.e. the previous) used valid lifetime at step 313.

Upon receiving the response from LMA, $MAG_2$ may detect that the received local prefix (e.g. $P_1$) is not the second local prefix (e.g. $P_2$) which has been sent to LMA (step 314). $MAG_2$ may deprecate $P_1$ by re-setting its valid lifetime and preferred lifetime, e.g. valid lifetime=used valid lifetime; preferred lifetime=0. If the MN can trust the received RA, valid lifetime may be set to 0 as well. At step 315, $MAG_2$ may send a message comprising HNP, both $P_1$ and $P_2$ together with their associated valid lifetime and preferred lifetime to the MN. Similar to step 37, a router advertisement (RA) message according to RFC4862 may be used for sending the message. The local prefix may be added to Prefix Information Option (PIO) field of the RA message. M-flags field in RA may be set to 0 in order to inform the MN that SLAAC is used for address configuration. A-flag field in RA message's PIO option may be set to 1 in order to indicate that the MN may use the said prefixes for stateless address autoconfiguration.

After receiving the two prefixes, the MN may use the new prefix (e.g. $P_2$) to form an IPv6 address on one of its interface. Thus, the MN may access public Internet via $MAG_2$ bypassing LMA after a handover is performed from $MAG_1$ to $MAG_2$.

Figure 4:
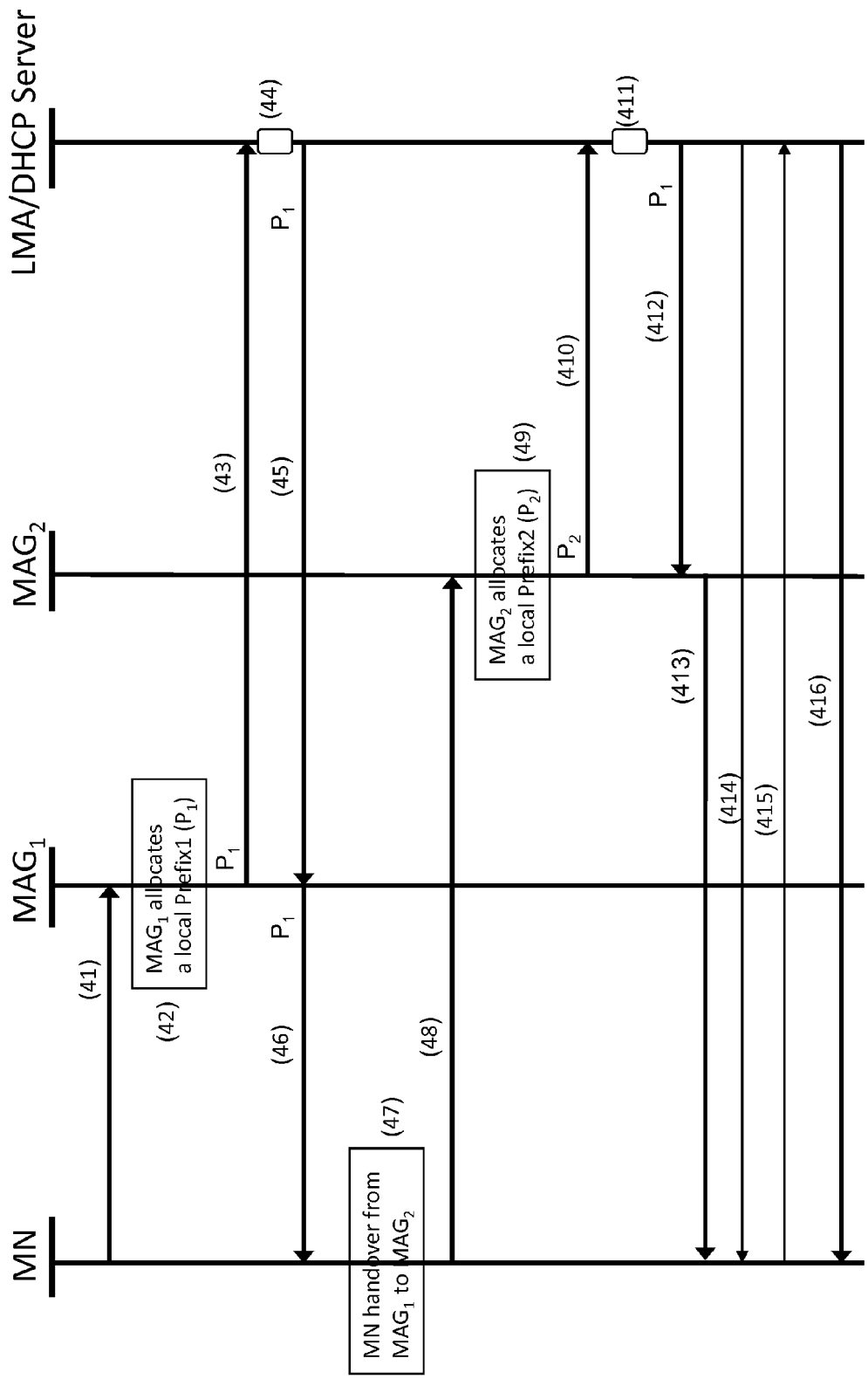
FIG. 4 describes the signaling flow when DHCPv6 (Dynamic Host Configuration Protocol v6) is used for local prefix management according to another embodiment of the invention.

FIG. 4 describes the signalling flow when DHCPv6 is used for local prefix management according to another embodiment of the invention. Whether SLAAC or DHCPv6 is used is determined by configuration of a system comprising MAG and LMA. When DHCPv6 is used for address configuration, M-flags in a RA message sent by a MAG may be set to 1 and the RA message need not contain any PIO.

Step 41-43 are identical to step 31-33 except that valid lifetime may be set by $MAG_1$ to any proper value depending on the network configuration.

Upon receiving a message comprising the first local prefix (e.g. $P_1$) anchored at $MAG_1$, LMA may check if there is already an entry with respect to the MN-ID and if not, it may store these information either by itself in a binding cache or in another network entity, e.g. DHCP server (step 44). LMA or DHCP server may construct an IPv6 address using the received prefix and set valid lifetime and preferred lifetime for the IPv6 address based on the received valid lifetime and preferred lifetime. The LMA/DHCP server may set a different value to valid lifetime, but it may not bigger than the received used valid lifetime. Then LMA or DHCP server may send a DHCP message comprising the constructed IPv6 address together with valid lifetime, preferred lifetime and HNP to $MAG_1$ (step 45). The DHCP server/LMA may include the required Identity Association (IA) options into the DHCP messages, IA_TA (Identity Association for Temporary Address) options for local prefixes and IA_NA (Identity Association for Non-temporary Address) for the HNP. The presence of IA_TA and IA_NA fields is an indication to the MN to use the provided prefix for address configuration. When $MAG_1$ determines that the message from LMA/DHCP comprises one IPv6 address constructed by using the first local prefix, it may relay the message to the MN (step 46).

Step 47-410 are identical to step 38-311 in FIG. 3 except that valid lifetime may be set by $MAG_2$ to any proper value depending on the network configuration.

In step 411, LMA or DHCP server may check if there is already an entry for the MN-ID. If so, it may replace the previous local prefix (e.g. $P_1$) by the new prefix (e.g. $P_2$) and construct two IPv6 addresses by using $P_1$ and $P_2$ respectively. LMA may also set a proper valid lifetime and preferred lifetime for $P_2$ and deprecate $P_1$ by setting both valid lifetime and preferred lifetime to 0. In DHCP case, the communication between the LMA/DHCP server and the MN is assumed to be secure as there is existing deployed methods to secure DHCP signalling, thus valid lifetime may also be set to 0.

At step 412, LMA or DHCP server may send a message comprising the two $P_1$ and HNP to $MAG_2$.

When $MAG_2$ determines that the local prefix contained in the message from LMA/DHCP server is not the same as the second local prefix (e.g. $P_2$), it may send a RA message without the PIO field to MN at step 413. The M-flag field in the RA message may be set to 1 in order to indicate that DHCP is used for address configuration.

LMA or DHCP server may send a reconfigure message to MN via $MAG_2$ as $MAG_2$ only relays the message (step 416). The message may comprise IA (Identity Association) in the ORO (Option Request Option) field so that a DHCP peer may tell the other peer what kind of options it is interested in and supports. By sending this message, the LMA/DHCP server may inform the MN to reconfigure its IA option.

In reply to the reconfigure message, MN may send a renew message comprising IA_TA (Identity Association for Temporary Address) option field to LMA or DHCP server via $MAG_2$ (step 415).

LMA or DHCP server may send a reply message to MN via $MAG_2$, wherein the message comprising HNP, two IPv6 addresses formed by $P_1$ and $P_2$ respectively and their associated valid lifetime and preferred lifetime (step 416). The IPv6 addresses formed by $P_1$ and $P_2$ may be inserted to IA_TA, and HNP may be inserted to IA_NA option field in DHCP reply message. The use of IA_TA and IA_NA options indicates that the MN may use the provided prefix for configuring its interface.

In IP layer, the MN and the LMA/DHCP server may communicate to each other directly in steps 414-416. In radio link layer, $MAG_2$ may be connected with the MN and may relay the messages between the MN and the LMA/DHCP server.

Figure 5:
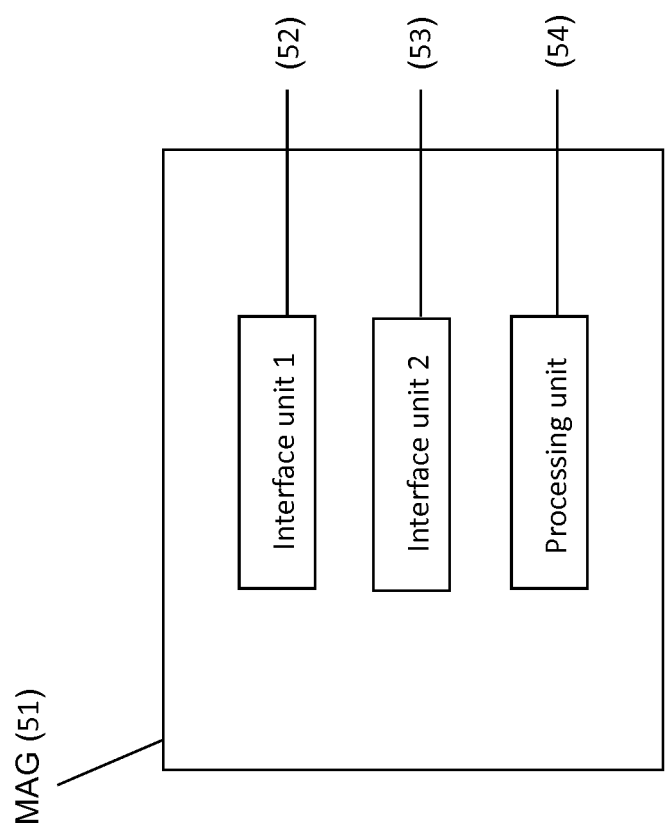
FIG. 5 shows a schematic block diagram illustrating a MAG according to one aspect of the invention.

FIG. 5 describes a schematic block diagram of a MAG according to one aspect of the invention.

A MAG (51) may comprise a first interface unit (52) configured to receive an attach request from a MN (e.g. step 31 in FIG. 3 or step 41 in FIG. 4). The MAG (51) may also comprise a processing unit (or a processing means) (54) configured to allocate a local prefix (e.g. $P_1$ or $P_2$) for a MN after receiving the attach request. Said processing unit may set valid lifetime and preferred lifetime for the prefix and set used valid lifetime the same value as valid lifetime (i.e. used valid lifetime=valid lifetime). Said processing unit may also generate a MN-ID in PMIPv6 domain for the MN. MN-ID is associated with the identifier of the MN obtained at radio access layer (at step 31 or 41). The MAG (51) may further comprise a second interface unit (53) configured to send a message comprising the allocated local prefix (e.g. $P_1$ or $P_2$) together with its associated used valid lifetime to a LMA or/and DHCP server. The second interface unit (53) may be configured to receive a response message from a LMA/DHCP server.

According to one embodiment of the invention, SLAAC may be used for local prefix management. In this case, the response message received from a LMA may comprise a HNP, a local prefix (e.g. $P_1$ or $P_2$) associated with the MN-ID and its used valid lifetime (e.g. step 33 or 311 in FIG. 3).

If the received local prefix is identical to the prefix sent to the LMA previously (e.g. step 33 in FIG. 3), the processing unit may be configured to send a message comprising the allocated local prefix and its associated valid lifetime and preferred lifetime to the MN (e.g. step 37 in FIG. 3)

If the received local prefix is different from the prefix sent to the LMA previously (e.g. step 311 in FIG. 3), the processing unit may be configured to send a message comprising both prefixes, i.e. the received one (e.g. $P_1$) and the allocated one (e.g. $P_2$), to the MN. The received one (e.g. $P_1$) may be deprecated by setting its preferred lifetime to 0 and setting its valid lifetime to the received used valid lifetime (i.e. valid lifetime=used valid lifetime). The local prefix may be added to Prefix Information Option (PIO) field of the RA message. A-flag filed in RA message should be set to 1 in order to indicate that the MN may use the prefix for stateless address autoconfiguration. The M-flag in a RA may be set to 0.

According to another embodiment of the invention, DHCP may be used for local prefix management. The response message received from a LMA/DHCP server may comprise a HNP, one IPv6 address comprising a local prefix associated with the MN-ID and its attributes (e.g. valid lifetime and preferred lifetime) (e.g. step 45 in FIG. 4). If the processing unit determines that the local prefix is identical to the one previously sent to LMA/DHCP server (e.g. in step 43 in FIG. 4), the processing unit may be configured to relay the message to the MN.

If the processing unit determines that the local prefix is not the same as the one previously sent to LMA/DHCP server (e.g. in step 410 in FIG. 4), the processing unit may be configured to send a RA message without PIO field to the MN (e.g. step 413).

Figure 6:
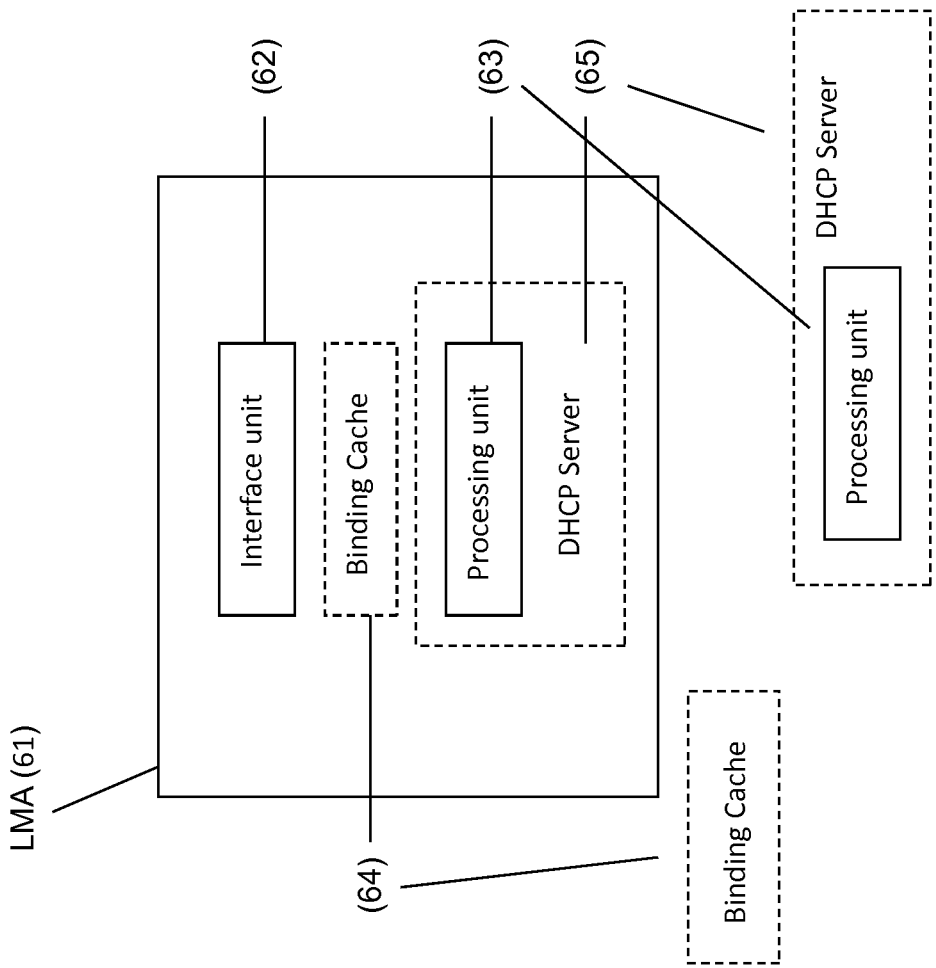
FIG. 6 shows a schematic block diagram illustrating a LMA according to another aspect of the invention.

FIG. 6 describes a schematic block diagram illustrating a LMA according to another aspect of the invention.

A LMA (61) may comprise a binding cache (64) configured to store information received from a network entity such as a MAG. Alternatively, the binding cache (64) may be a standalone entity. The LMA may comprise an interface unit (62) configured to receive a message (e.g. step 33 & 311 in FIG. 3 or step 43 & 410 in FIG. 4) comprising a MN-ID, a local prefix (e.g. $P_1$ or $P_2$) allocated for the MN of the MN-ID and its associated attribute used valid lifetime from a MAG. The LMA may further comprise a processing unit (or a processing means) (63) configured to check if there is already an entry regarding the MN-ID in the binding cache upon receiving the message. If not, said processing unit (63) may be configured to set up the entry for the MN-ID, otherwise, said processing unit may be configured to replace the exiting prefix (e.g. $P_1$) by the newly received prefix (e.g. $P_2$) in the binding cache if the received local prefix is not the same as the one stored in the binding cache (64).

According to one embodiment of the invention, SLAAC may be used for local prefix management. If no entry regarding a received MN-ID is found in the binding cache, the processing unit may be configured to send a message comprising the received the MN-ID, the prefix (e.g. $P_1$ or $P_2$) and the attribute used valid lifetime to the MAG (e.g. step 35 in FIG. 3). If there is already an entry in the binding cache and the received local prefix (e.g. $P_2$), with respect to the MN-ID, is not the same as the one stored (e.g. $P_1$) in the binding cache, said processing unit may be configured to send a message comprising the previous local prefix (e.g. $P_1$) and its associated used valid lifetime to the MAG (e.g. step 313 in FIG. 3).

According to another embodiment of the invention, DHCPv6 may be used for local prefix management. If no entry regarding a received MN-ID is found in the binding cache, the processing unit (63) may be configured to set the valid lifetime and preferred lifetime for the received prefix based on the received used valid lifetime. The valid lifetime may be set to a different value than used valid lifetime but it may not bigger than used valid lifetime. The preferred lifetime may be bigger than 0 but smaller than valid lifetime. The processing unit may be configured to send a message comprising the received HNP, an IPv6 address comprising the received prefix (e.g. $P_1$) and the valid lifetime and preferred lifetime to the MAG (e.g. step 45 in FIG. 4).

If there is already an entry in the binding cache and the received local prefix (e.g. $P_2$), with respect to the MN-ID, is not the same as the one stored (e.g. $P_1$) in the binding cache, said processing unit may be configured to set the attributes valid lifetime and preferred lifetime for the received prefix (e.g. $P_2$) based on the received used valid lifetime and to deprecate the previous prefix (e.g. $P_1$) by setting both its valid lifetime and preferred lifetime to 0. Said processing unit may be configured to send a message comprising two IPv6 addresses formed with the previous (e.g. $P_1$) and received local prefix (e.g. $P_2$) respectively and their associated attributes (e.g. valid lifetime and preferred lifetime) to the MAG (e.g. step 416 in FIG. 4). The IPv6 address may be inserted to IA_TA optional field of IA field of DHCP reply message. The use of IA_TA option implies that the MN may use the prefix for configuring its interface.

Said processing unit may be configured to send a reconfigure message to the MN directly (e.g. step 414 in FIG. 4) and said interface unit may be configured to receive a renew message from the MN directly (e.g. step 415 in FIG. 4).

Said processing unit may be located in the DHCP server as well according to different embodiment of the invention.

For the purpose of the present invention as described above, it should be noted that method steps likely to be implemented as software code portions and being run using a processor at one of the server entities are software code independent and can be specified using any known or future developed programming language;

method steps and/or devices likely to be implemented as hardware components at one of the server entities are hardware independent and can be implemented using any known or future developed hardware technology or any hybrids of these, such as MOS, CMOS, BiCMOS, ECL, TTL, etc, using for example ASIC components or DSP components, as an example;

generally, any method step is suitable to be implemented as software or by hardware without changing the idea of the present invention;

devices can be implemented as individual devices, but this does not exclude that they are implemented in a distributed fashion throughout the system, as long as the functionality of the device is preserved.

It is to be understood that the above description is illustrative of the invention and is not to be construed as limiting the invention. Various modifications and applications may occur to those skilled in the art without departing from the scope of the invention as defined by the appended claims.

The invention claimed is:

1. A method comprising:
   receiving at a network element a connection request from a mobile node;
   obtaining, based on the received connection request, an identifier relevant to said mobile node;
   allocating at the network element a first local prefix, wherein the allocating of the first local prefix allows the mobile node to connect to the network element and access a network;
   setting a first timer requiring a length of time for which the first local prefix or an address comprising the first local prefix is valid;
   setting a second timer indicating a length of time the first local prefix or the address comprising the first local prefix is preferred when the first local prefix or the address is valid; and
   sending from the network element a first message to another network element after setting the first timer and the second timer, wherein the first message comprises said identifier, said first local prefix, and said first timer that requires the length of time.

2. The method according to claim 1, further comprising:
   receiving a response message comprising a second local prefix and a third timer indicating a length of time the second local prefix or an address comprising the second local prefix is valid;
   determining if said second local prefix is identical to the first local prefix;
   in the event that said second local prefix is identical to the first local prefix,
   sending to the mobile node a second message comprising the first local prefix, the first timer, the second timer and an indication to use a prefix for address configuration;
   in the event that the second local prefix is different from the first local prefix,
   setting a fourth timer indicating a length of time the second local prefix or the address comprising the second local prefix is preferred when the second local prefix or the address is valid to 0; and
   sending a second message comprising the first local prefix, the first timer, the second timer, the second local prefix, the third timer, the fourth timer, and an indication to use a prefix for address configuration to the mobile node.

3. The method according to claim 1, further comprising:
   receiving, from said another network element, a response message comprising a second local prefix, a third timer indicating a length of time the second local prefix or an address comprising the second local prefix is valid, a fourth timer indicating a length of time the second local prefix or the address comprising the second local prefix is preferred when the second local prefix or the address is valid and an indication to use a prefix for address configuration;
   determining if said second local prefix is identical to the first local prefix;
   in the event that said second local prefix is identical to the first local prefix,
   sending the received response message to the mobile node; and
   in the event that the second local prefix is different from the first local prefix,
   sending a router advertisement message to the mobile node.

4. A method comprising:
   receiving, from a gateway network entity, a message comprising an identifier relevant to a mobile node, a first local prefix, and a first timer requiring a length of time for which the first local prefix or an address comprising the first local prefix is valid, wherein the allocating of the first local prefix allows the mobile node to connect to the network entity and access a network;
   determining if an entry associated with the identifier exists or not;
   in the event that the entry does not exist,
   storing the received information, setting a second timer indicating a length of time the first local prefix or the address comprising the first local prefix is preferred when the first local prefix or the address is valid, and sending a response message comprising the received information, the second timer and an indication to use a prefix for address configuration to the gateway network entity.

5. The method according to claim 4, further comprising:

in the event that the entry exists, wherein said entry comprises a second local prefix and a third timer indicating a length of time the second local prefix or an address comprising the second local prefix is valid, replacing the second local prefix and the third timer by the first local prefix and the first timer.

6. The method according to claim 5, wherein said method being implemented by using a stateless address autoconfiguration protocol, said method further comprising:

sending a response message comprising the second local prefix and the third timer to the gateway network entity.

7. The method according claim 6, wherein said method being implemented by using a dynamic host configuration protocol v6, said method further comprising:

sending a response message comprising the second local prefix to the gateway network entity.

8. The method according claim 7, further comprising:

setting a second timer indicating a length of time the first local prefix or the address comprising the first local prefix is preferred when the first local prefix or the address is valid;

setting a fourth timer indicating a length of time the second local prefix or the address comprising the second local prefix is preferred when the second local prefix or the address is valid to 0;

setting the third timer to 0; and sending a response message comprising the first timer, the second timer, the third timer, the fourth timer, the first and the second local prefix, and an indication to use a prefix for address configuration to the mobile node.

9. A network element comprising a processing unit, a first interface unit and a second interface unit, wherein said first interface unit is configured to receive a connection request, and wherein said processing unit is configured to:

obtain, based on the received connection request, an identifier relevant to a mobile node;

allocate a first local prefix, wherein the allocating of the first local prefix allows the mobile node to connect to the network element and access a network;

set a first timer requiring a length of time for which the first local prefix or an address comprising the first local prefix is valid;

set a second timer indicating a length of time the first local prefix or the address comprising the first local prefix is preferred when the first local prefix or the address is valid; and send a first message to another network element through the second interface unit, after setting the first timer and the second timer, wherein the first message comprises said identifier, said first local prefix, and said first timer that requires the length of time.

10. The network element according to claim 9, wherein said second interface unit is configured to receive a response message comprising a second local prefix and a third timer indicating a length of time the second local prefix or an address comprising the second local prefix is valid;

said processing unit is further configured to determine if said second local prefix is identical to the first local prefix;

in the event that said second local prefix is identical to the first local prefix, said processing unit is configured to send to the mobile node a second message comprising the first local prefix, the first timer, the second timer and an indication to use a prefix for address configuration through said first interface unit;

in the event that the second local prefix is different from the first local prefix, said processing unit is configured to:

set a fourth timer indicating a length of time the second local prefix or the address comprising the second local prefix is preferred when the second local prefix or the address is valid to 0; and send a second message comprising the first local prefix, the first timer, the second timer, the second local prefix, the third timer, the fourth timer, and an indication to use a prefix for address configuration to the mobile node through said first interface unit.

11. The network element according to claim 9, wherein said second interface unit is configured to receive, from said another network element, a response message comprising a second local prefix, a third timer indicating a length of time the second local prefix or an address comprising the second local prefix is valid, a fourth timer indicating a length of time the second local prefix or the address comprising the second local prefix is preferred when the second local prefix or the address is valid and an indication to use a prefix for address configuration;

said processing unit is further configured to determine if said second local prefix is identical to the first local prefix;

in the event that said second local prefix is identical to the first local prefix, said processing unit is configured to send the received response message to the mobile node through said first interface unit; and in the event that the second local prefix is different from the first local prefix, said processing unit is configured to send a router advertisement message to the mobile node through said first interface unit.

12. A server comprising a processing unit, an interface unit and a database, wherein, said interface unit is configured to receive, from a gateway network entity, a message comprising an identifier relevant to a mobile node, a first local prefix, and a first timer requiring a length of time for which the first local prefix or an address comprising the first local prefix is valid, wherein the allocating of the first local prefix allows the mobile node to connect to the network entity and access a network;

said processing unit is configured to determine if an entry associated with the identifier exists or not;

in the event that the entry does not exist, said database is configured to store the received information, said processing unit is configured to:

set a second timer indicating a length of time the first local prefix or the address comprising the first local prefix is preferred when the first local prefix or the address is valid; and send a response message comprising the received information and the second timer to the gateway network entity through said interface unit.

13. The server according to claim 12, wherein
in the event that the entry exists and said entry comprises a second local prefix and a third timer indicating a length of time the second local prefix or an address comprising the second local prefix is valid,
said processing unit is configured to replace the second local prefix and the third timer by the first local prefix and the first timer.

14. The server according to claim 13, wherein said server being configured to implement a stateless address autoconfiguration protocol, said processing unit is further configured to:
send a response message comprising the second local prefix and the third timer to the gateway network entity through said interface unit.

15. The server according to claim 13, wherein said server being configured to implement a dynamic host configuration protocol, said processing unit is further configured to:
send a response message comprising the second local prefix to the gateway network entity through said interface unit.

16. The server according to claim 15, wherein said processing unit is further configured to:
set a second timer indicating a length of time the first local prefix or the address comprising the first local prefix is preferred when the first local prefix or the address is valid,
set a fourth timer indicating a length of time the second local prefix or the address comprising the second local prefix is preferred when the second local prefix or the address is valid to 0,
set the third timer to 0, and
send a response message comprising the first timer, the second timer, the third timer, the fourth timer, the first and the second local prefix, and an indication to use a prefix for address configuration to the mobile node through said interface unit.

17. A computer program product embodied in a non-transitory computer-readable medium and encoding instructions that, when executed in hardware, perform a process, the process comprising:

receiving at a network entity a connection request from a mobile node;
obtaining, based on the received connection request, an identifier relevant to said mobile node;
allocating at the network element a first local prefix, wherein the allocating of the first local prefix allows the mobile node to connect to the network element and access a network;
setting a first timer requiring a length of time for which the first local prefix or an address comprising the first local prefix is valid;
setting a second timer indicating a length of time the first local prefix or the address comprising the first local prefix is preferred when the first local prefix or the address is valid; and
sending from the network element a first message to another network element after setting the first timer and the second timer, the first message comprising said identifier, said first local prefix, and said first timer that requires the length of time.

18. A computer program product embodied in a non-transitory computer-readable medium and encoding instructions that, when executed in hardware, perform a process, the process comprising:
receiving, from a gateway network entity, a message comprising an identifier relevant to a mobile node, a first local prefix, and a first timer requiring a length of time for which the first local prefix or an address comprising the first local prefix is valid, wherein the allocating of the first local prefix allows the mobile node to connect to the network entity and access a network;
determining if an entry associated with the identifier exists or not;
in the event that the entry does not exist,
storing the received information;
setting a second timer indicating a length of time the first local prefix or the address comprising the first local prefix is preferred when the first local prefix or the address is valid; and
sending a response message comprising the received information, the second timer and an indication to use a prefix for address configuration to the gateway network entity.

* * * * *